G. C. DE BRIAILLES.
MANUFACTURE, CONCENTRATION, AND SIMULTANEOUS PURIFICATION OF SULFURIC ACID.
APPLICATION FILED OCT. 30, 1908.
928,844.  Patented July 20, 1909.
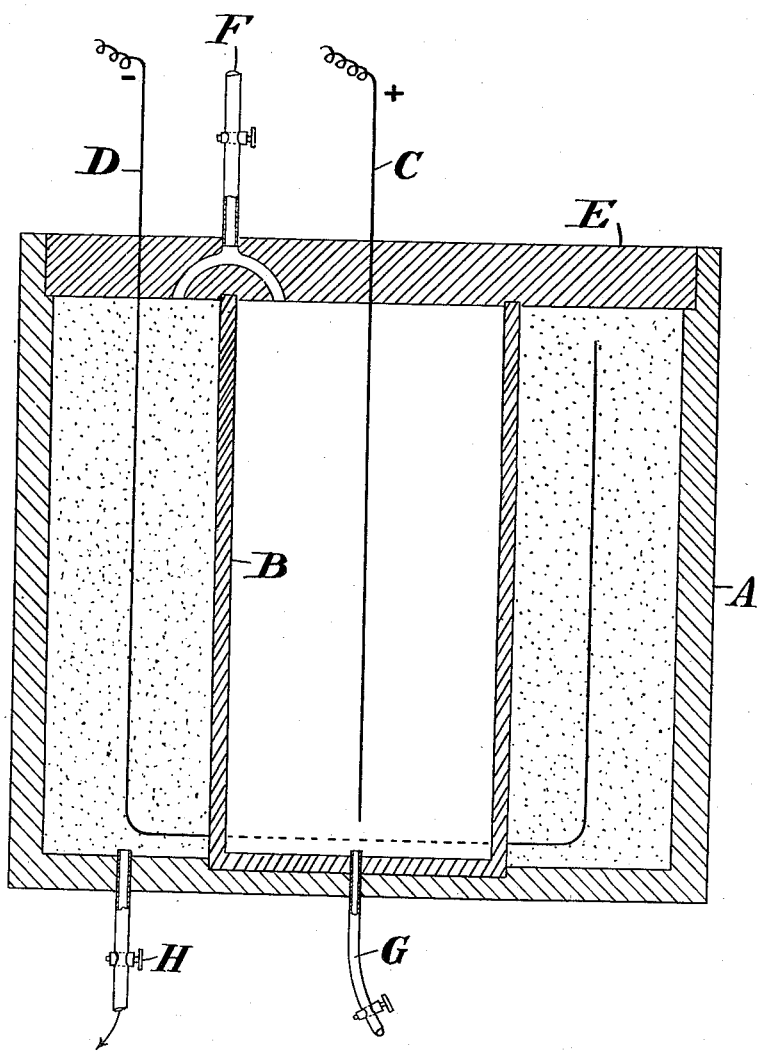

UNITED STATES PATENT OFFICE.

GASTON CHANDON DE BRIAILLES, OF PARIS, FRANCE.

MANUFACTURE, CONCENTRATION, AND SIMULTANEOUS PURIFICATION OF SULFURIC ACID.

No. 928,844.          Specification of Letters Patent.          Patented July 20, 1909.

Application filed October 30, 1908. Serial No. 460,341.

*To all whom it may concern:*

Be it known that I, GASTON CHANDON DE BRIAILLES, a citizen of the Republic of France, residing in Paris, in the Republic of France, have invented certain new and useful Improvements in the Manufacture, Concentration, and Simultaneous Purification of Sulfuric Acid, for which application has been made in France October 31, 1907.

This invention relates to a process of manufacture and simultaneous concentration and purification of sulfuric acid dispensing with the use of lead chambers, boilers and other articles of platinum, as well as nitric compounds, and steam generators, and serving for the continuous manufacture and concentration of sulfuric acid. In this process the sulfuric acid is produced by direct oxidation of sulfurous acid by nascent oxygen obtained by an electrolytic decomposition of water. The sulfurous acid enters by the positive electrode and is scrubbed in the water (which is decomposed under the action of the current), until the oxygen is released, which acts in a nascent condition. The hydrogen is separately collected.

The apparatus is shown in the accompanying drawings which applying the principle set forth, subjects it to practical conditions yielding a valuable industrial result.

Starting with sulfurous acid from pyrites, concentrated and purified sulfuric acid and precipitated pure sulfur, are obtained without deleterious intermediaries.

Reference will now be made to the accompanying drawing in which, of course as an example, the apparatus in question is shown in vertical section. It is composed of an external earthenware vessel A, preferably cylindrical and capable of supporting a certain pressure. A second, cylindrical, vessel B of porous porcelain is inserted axially in the vessel A. A platinum wire C placed in the axis of the vessel B serves for connection to the positive pole.

In the vessel A, a mixture in suitable proportions of granules of retort carbon or coke and antimoniated lead, is packed all around the vessel B. An antimoniated lead rod D passes through the mass of these granules and serves as connection to the negative pole. A tight fitting earthenware lid or cover E hermetically closes the vessels A and B, with the aid of a mastic which resists the action of concentrated sulfuric acid. The two rods C and D pass through tight joints.

A suitably proportioned mixture of liquefied sulfurous acid, supplied directly from the furnaces and compressed to the desired degree, and of sulfuric acid at 45° Baumé, that is to say having a sufficient quantity of water to give it the same density as the liquid sulfurous acid, is introduced into the two vessels A and B by a pipe F, which passes through a hermetically closed joint in the cover or lid E. Of course the pressure must be maintained at the necessary minimum. The water thus introduced into the apparatus has for its object to insure the conductivity of the mixture necessary for the electrolysis, at the same time it is itself decomposed, furnishing at the anode the nascent oxygen, which oxidizes the sulfurous acid and converts it into sulfuric acid around the platinum wire C. At the same time, if the current is of a suitable intensity very fine and pure sulfur is deposited in proximity to the negative electrode D by the action of the sulfurous acid and of the sulfhydric acid due to the reduction of a portion of the sulfurous acid by the nascent hydrogen.

The sulfuric acid formed is of a high degree of purity, because the sulfurous acid is freed from a number of impurities in consequence of the slight compression necessary for its liquefaction and which allows foreign gases to escape; in addition the electrolysis decomposes the liquids and the solids which are vaporized or precipitated. It further becomes hydrated by taking up the water of the acid introduced, and it has been ascertained that at the moment when the activity of the electrolysis is smallest the consumption of current is a minimum. The size and especially the distance apart of the walls of the vessels A and B must be small, and the current of sulfurous acid sufficiently rapid. A tube G for discharging the sulfuric acid connects with the lower part of the vessel B. In the vessel A around the carbon and antimoniated lead granules, and around the rod D, the solution of ordinary sulfuric acid mixed with the liquid sulfurous acid is renewed simultaneously with the latter.

At the end of a certain time when the precipitated sulfur has accumulated in the vessel A and the vessel B is filled with concentrated sulfuric acid, the inflow of sulfurous acid at F is stopped, and the pressure is suspended, and the sulfurous acid which expands and vaporizes is collected in a gas generator. A part of the concentrated sulfuric acid is withdrawn at G, and at H the semi-liquid sulfur, while water which assists this latter operation is introduced at F. The sulfur is separated by decantation and then the vessel is set going again as before. The very fine and very pure sulfur which is thus obtained almost directly from pyrites, after having passed through the condition of sulfurous gas by roasting, then the latter reduced by nascent hydrogen, enables a secondary product to be obtained, the utilization of which improves the general profit of the operation and consequently lowers the cost of manufacture of the concentrated sulfuric acid. The secondary products in question may also be varied according to fluctuations of commercial requirements. Thus by lowering the sulfurous and sulfuric acid contents in the initial solution to be electrolyzed, the voltage may be lowered and the hydrogen will be released at the cathode without combining. It may be utilized directly for any suitable purposes, such as an explosive gas for a motor, a combustible for heating purposes, an autogenous solder, aerostation, manufacture of hydrids and the like.

The advantages of this process and the apparatus hereinbefore described are numerous. Lead chambers are dispensed with and there is a saving of space. Nitric acid is dispensed with, costly vessels of platinum or porcelain are avoided and the sulfuric acid made is simultaneously purified.

I declare that what I claim is:—

1. In the process of manufacturing sulfuric acid from sulfurous acid by electrolysis of a solution of sulfurous acid, keeping the solution at substantially the same specific gravity as the solution of sulfurous acid by adding the requisite quantity of sulfuric acid.

2. In the manufacture of sulfuric acid by the direct oxidation of sulfurous acid, keeping the sulfurous acid at about 45 degrees Baumé and under sufficient pressure to prevent the sulfurous acid escaping.

In witness whereof, I have hereunto signed my name this 16th day of October 1908, in the presence of two subscribing witnesses.

GASTON CHANDON DE BRIAILLES.

Witnesses:
ANTONIN MONTEILHET,
DEAN B. MASON.